US012811428B2

(12) United States Patent
Guan et al.

(10) Patent No.: US 12,811,428 B2
(45) Date of Patent: Nov. 24, 2026

(54) CHARGING METHOD, ELECTRONIC APPARATUS, AND STORAGE MEDIUM

(71) Applicant: Ningde Amperex Technology Limited, Ningde (CN)

(72) Inventors: Ting Guan, Ningde (CN); Shan Zhu, Ningde (CN); Fei Wu, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 857 days.

(21) Appl. No.: 18/192,228

(22) Filed: Mar. 29, 2023

(65) Prior Publication Data

US 2023/0231405 A1 Jul. 20, 2023

Related U.S. Application Data

(63) Continuation of application No. PCT/CN2020/139567, filed on Dec. 25, 2020.

(51) Int. Cl.
*H02J 7/96* (2026.01)
*H01M 10/44* (2006.01)
(Continued)

(52) U.S. Cl.
CPC ............. *H02J 7/96* (2026.01); *H01M 10/441* (2013.01); *H02J 7/50* (2026.01); *H02J 7/80* (2026.01); *H02J 7/84* (2026.01)

(58) Field of Classification Search
CPC ........................................................ H02J 7/96
(Continued)

(56) References Cited

U.S. PATENT DOCUMENTS

2020/0366116 A1 11/2020 Yang
2022/0271353 A1* 8/2022 Chen .................. H01M 10/443

FOREIGN PATENT DOCUMENTS

CN 103107378 B 5/2013
CN 108110349 A 6/2018
(Continued)

OTHER PUBLICATIONS

Office Action issued on Nov. 24, 2023, in corresponding Chinese Application No. 202080028316.5, 20 pages.
(Continued)

*Primary Examiner* — Ahmed H Omar
(74) *Attorney, Agent, or Firm* — Maier & Maier, PLLC

(57) ABSTRACT

A charging method for battery includes: in an n-th charging process, charging a first battery to a charge cut-off voltage $U_n$ in a first charging manner; after the n-th charging process is completed, leaving the first battery standing, and obtaining an open-circuit voltage $OCV_n$ of the first battery at a standing time of $t_i$; in an m-th charging process, charging the first battery to the charge cut-off voltage $U_n$ in the first charging manner; after the m-th charging process is completed, leaving the first battery standing, and obtaining an open-circuit voltage $OCV_m$ of the first battery at the standing time of $t_i$; and under the condition of $OCV_n > OCV_m$, in an (m+1)-th charging process and subsequent charging processes, charging the first battery to the charge cut-off voltage $U_n$ in the first charging manner and then continuing to charge the first battery to a first voltage $U_{m+1}$ in a second charging manner.

16 Claims, 4 Drawing Sheets

(51) Int. Cl.
*H02J 7/50* (2026.01)
*H02J 7/80* (2026.01)
*H02J 7/84* (2026.01)

(58) Field of Classification Search
USPC .......................................................... 320/162
See application file for complete search history.

(56) References Cited

FOREIGN PATENT DOCUMENTS

| | | | | | |
|---|---|---|---|---|---|
| CN | 109004694 A | | 12/2018 | | |
| CN | 110098646 A | | 8/2019 | | |
| CN | 110518666 A | | 11/2019 | | |
| CN | 111384757 A | * | 7/2020 | ............ | H01M 10/44 |
| CN | 111416412 A | | 7/2020 | | |
| CN | 111446750 A | | 7/2020 | | |
| CN | 112005426 A | | 11/2020 | | |
| CN | 112106248 | | 12/2020 | | |
| JP | 2003070161 A | | 3/2003 | | |
| WO | 2017128724 A1 | | 8/2017 | | |
| WO | 2017147741 A1 | | 9/2017 | | |

OTHER PUBLICATIONS

Extended European Search Report issued on Feb. 8, 2024, in corresponding European Application No. 20966617.1, 8 pages.
International Search Report issued on Sep. 18, 2021, in corresponding International Patent Application No. PCT/CN2020/139567, 5 pages.
Office Action issued on May 24, 2024, in corresponding Chinese Application No. 202080028316.5, 25 pages.

* cited by examiner

CHARGING METHOD, ELECTRONIC APPARATUS, AND STORAGE MEDIUM

CROSS REFERENCES

The present application is a national phase application of PCT application PCT/CN2020/139567, filed on Dec. 25, 2020, the disclosure of which is hereby incorporated by reference in its entirety.

TECHNICAL FIELD

This application relates to the field of battery technologies, and in particular, to a charging method, an electronic apparatus, and a storage medium.

BACKGROUND

In existing charging methods for battery, when a charge cut-off current is relatively large, with use of a battery, it is likely that the battery cannot be charged to a full charge state. The full charge state means that the battery is charged to a battery level of 100%. With use of a battery, impedance of the battery increases constantly, and the battery will inevitably become unable to be fully charged, in contrast with a fresh state of the battery or a conventional constant-voltage charging method under a limited charge voltage (cut-off current is relatively small in the case of constant-voltage charging under a limited charge voltage), which means that charge cut-off state of charge (SOC) of the battery gradually decreases. Currently, there is no feasible solution that can fully charge a battery in use without greatly prolonging the time required for charging the battery to the full charge state.

SUMMARY

In view of this, it is necessary to provide a charging method for battery, an electronic apparatus, and a storage medium, so that a requirement for fully charging a battery can be met.

An embodiment of this application provides a charging method for battery. The method includes: in an n-th charging process, charging a first battery to a charge cut-off voltage $U_n$ in a first charging manner, where n is a positive integer greater than 0; after the n-th charging process is completed, leaving the first battery standing, and obtaining an open-circuit voltage $OCV_n$ of the first battery at a standing time of $t_i$; in an m-th charging process, charging the first battery to the charge cut-off voltage $U_n$ in the first charging manner, where m is a positive integer, and m>n; after the m-th charging process is completed, leaving the first battery standing, and obtaining an open-circuit voltage $OCV_m$ of the first battery at the standing time of $t_i$; and under the condition of $OCV_n>OCV_m$, in an (m+1)-th charging process and subsequent charging processes, charging the first battery to the charge cut-off voltage $U_n$ in the first charging manner and then continuing to charge the first battery to a first voltage $U_{m+1}$ in a second charging manner, where $U_{m+1}=U_n+k\times(OCV_n-OCV_m)$, and $0<k\leq 1$.

According to some embodiments of this application, the voltage $OCV_n$ further includes a pre-stored open-circuit voltage, where the open-circuit voltage is an open-circuit voltage of a second battery collected at the standing time of $t_i$ in the standing process that follows completion of the n-th charging process, where the first battery and the second battery are different batteries in a same battery system.

According to some embodiments of this application, the method further includes: under the condition of $OCV_n\leq OCV_m$, in the (m+1)-th charging process and the subsequent charging processes, charging the first battery to the charge cut-off voltage $U_n$ in the first charging manner.

According to some embodiments of this application, the method further includes: in an (m+b)-th charging process, charging the first battery to the charge cut-off voltage $U_n$ in the first charging manner and then continuing to charge the first battery to the first voltage $U_{m+1}$ in the second charging manner, where b is a positive integer greater than 1; after the (m+b)-th charging process is completed, leaving the first battery standing, and obtaining an open-circuit voltage $OCV_{m+b}$ of the first battery at the standing time of $t_i$; and under the condition of $OCV_n>OCV_{m+b}$, in an (m+b+1)-th charging process and subsequent charging processes, charging the first battery to the first voltage $U_n$ in the first charging manner and then continuing to charge the first battery to a second voltage $U_{m+b+1}$ in the second charging manner, where $U_{m+b+1}=U_{m+1}+k\times(OCV_n-OCV_{m+b})$, and $0<k\leq 1$.

According to some embodiments of this application, the method further includes: under the condition of $OCV_n\leq OCV_{m+b}$, in the (m+b+1)-th charging process and the subsequent charging processes, charging the first battery to the charge cut-off voltage $U_n$ in the first charging manner and then continuing to charge the first battery to the first voltage $U_{m+1}$ in the second charging manner.

According to some embodiments of this application, $U_{cl}\leq U_n\leq U_{cl}+500$ mV, where $U_{cl}$ is a limited charge voltage of a battery system to which the first battery belongs.

According to some embodiments of this application, the first charging manner includes N1 charging phases in sequence, where N1 is a positive integer greater than or equal to 1, and in the N1-th charging phase, the first battery is charged constantly with the charge cut-off voltage $U_n$.

According to some embodiments of this application, the second charging manner includes N2 charging phases in sequence, where N2 is a positive integer greater than or equal to 1, and in the N2-th charging phase, the first battery is charged constantly with the first voltage $U_{m+1}$.

According to some embodiments of this application, the first charging manner includes M1 constant-current charging phases in sequence, where M1 is a positive integer greater than or equal to 1, where in each constant-current charging phase, after a voltage of the first battery reaches the charge cut-off voltage $U_n$, each of the subsequent constant-current charging phases is cut off by using the charge cut-off voltage $U_n$. The M1 constant-current charging phases are each defined as an i-th charging phase, with i=1, 2, . . . , M1, where a charge current of an (i+1)-th charging phase is less than a charge current of the i-th charging phase.

According to some embodiments of this application, the second charging manner includes M2 constant-current charging phases in sequence, where M2 is a positive integer greater than or equal to 1, where each constant-current charging phase of the M2 constant-current charging phases is cut off by using the first voltage $U_{m+1}$. The M2 constant-current charging phases are each defined as a j-th charging phase, with j=1, 2, . . . , M2, where a charge current of a (j+1)-th charging phase is less than a charge current of the j-th charging phase.

An embodiment of this application provides an electronic apparatus. The electronic apparatus includes: a battery and a processor, where the processor is configured to execute the foregoing charging method to charge the battery.

An embodiment of this application provides a storage medium, storing at least one computer instruction, where the instruction is loaded by a processor to execute the foregoing charging method.

According to the embodiments of this application, based on an actual aging state of the battery, the charge cut-off voltage of the battery in the charging process is increased, so as to resolve the problem that with the cycling of a battery, impedance of the battery increases, and the battery cannot be fully charged by using a charging method with a relatively large charge cut-off current. The charging method provided by the embodiments of this application can not only meet a requirement for fully charging a battery, but also shorten the time required for charging the battery to a full charge state, so as to improve user experience.

REFERENCE SIGNS OF MAIN COMPONENTS

Electronic apparatus 1
Charging system 10
Memory 11
Processor 12
Battery 13
Charging module 101
Obtaining module 102

DETAILED DESCRIPTION

The following clearly and completely describes the technical solutions in the embodiments of this application with reference to the accompanying drawings in the embodiments of this application. Apparently, the described embodiments are only some rather than all of the embodiments of this application.

Figure 1:
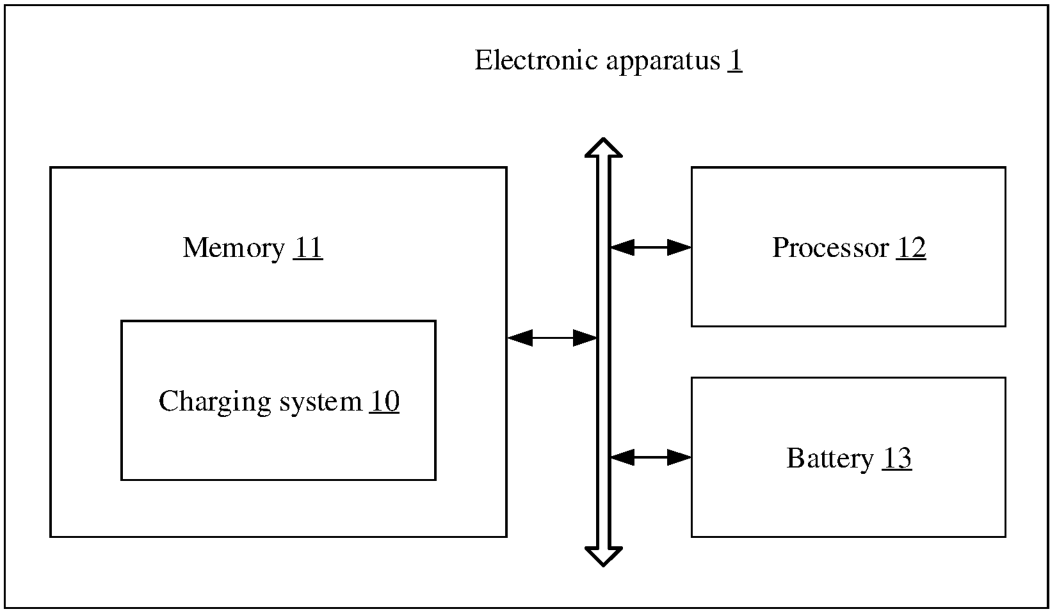
FIG. 1 is a schematic diagram of an electronic apparatus according to an embodiment of this application.

Referring to FIG. 1, FIG. 1 is a schematic diagram of an electronic apparatus according to an embodiment of this application. Referring to FIG. 1, a charging system 10 runs in an electronic apparatus 1. The electronic apparatus 1 includes, but is not limited to, a memory 11, at least one processor 12, and a battery 13 (a first battery and/or a second battery described below), where the memory 11, the at least one processor 12, and the battery 13 may be connected to one another through a bus, or may be directly connected.

In an embodiment, the battery 13 is a rechargeable battery, and is configured to supply power to the electronic apparatus 1. For example, the battery 13 may be a lithium-ion battery, a lithium polymer battery, a lithium iron phosphate battery, or the like. The battery 13 includes at least one battery cell (battery cell), and is appropriate to use a recyclable recharging manner.

The battery 13 is logically connected to the processor 12 through a power management system, so as to implement functions such as charging, discharging, and power consumption management through the power management system.

It should be noted that, FIG. 1 only illustrates the electronic apparatus 1 by example. In other embodiments, the electronic apparatus 1 may alternatively include more or fewer components, or have different component configurations. The electronic apparatus 1 may be an electric motorcycle, an electric bicycle, an electric vehicle, a mobile phone, a tablet computer, a personal digital assistant, a personal computer, or any other appropriate rechargeable devices.

Although not shown, the electronic apparatus 1 may further include a wireless fidelity (Wireless Fidelity, Wi-Fi) unit, a Bluetooth unit, a loudspeaker, and other components. Details are not described herein again.

Figure 2:
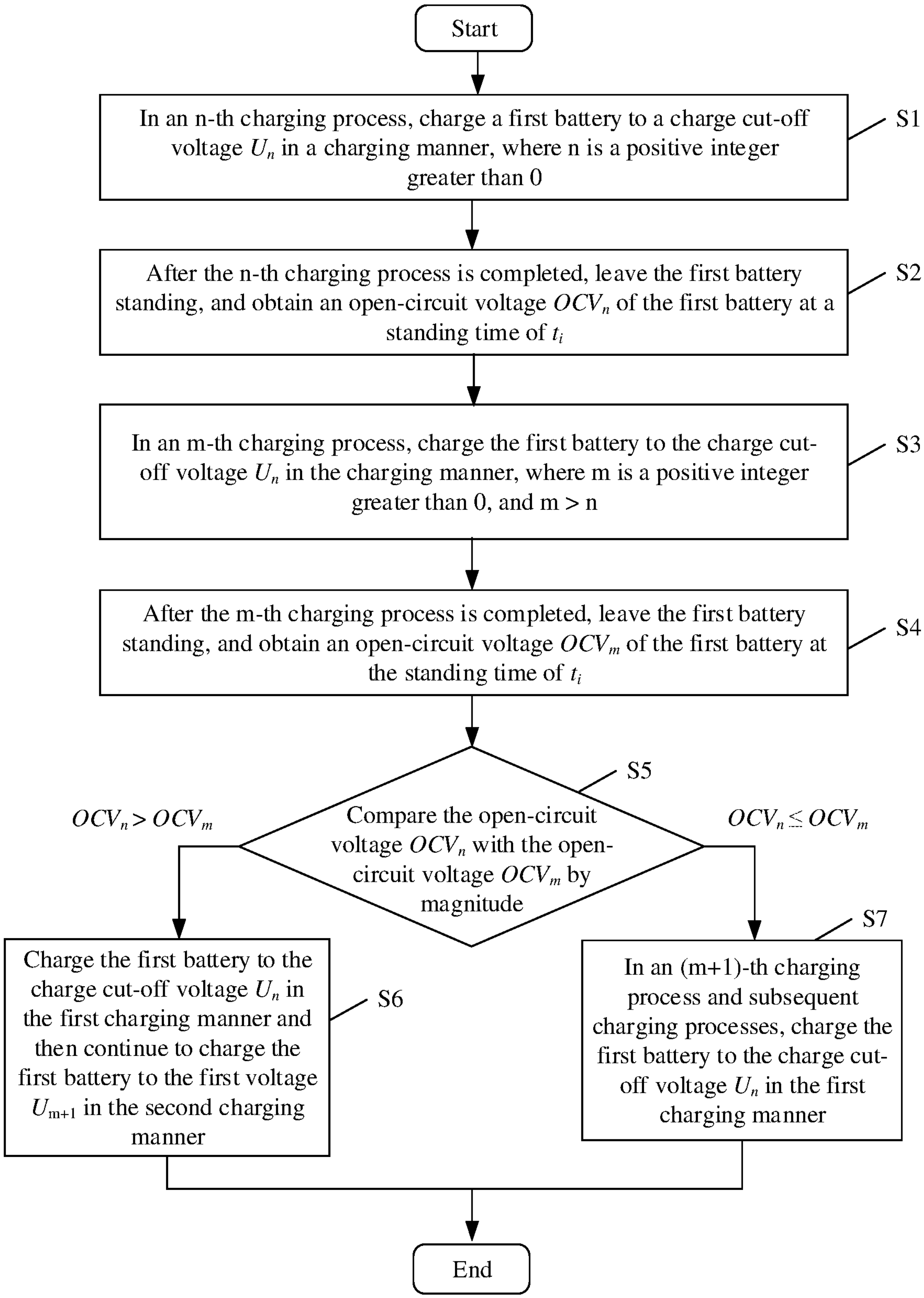
FIG. 2 is a flowchart of a charging method according to an embodiment of this application.

Referring to FIG. 2, FIG. 2 is a flowchart of a charging method for battery according to an embodiment of this application. Depending on different demands, the sequence of steps in the flowchart may be changed, and some steps may be omitted. Specifically, the charging method for battery may include the following steps.

Step S1: In an n-th charging process, charge a first battery to a charge cut-off voltage $U_n$ in a first charging manner, where n is a positive integer greater than 0.

Figure 4A:
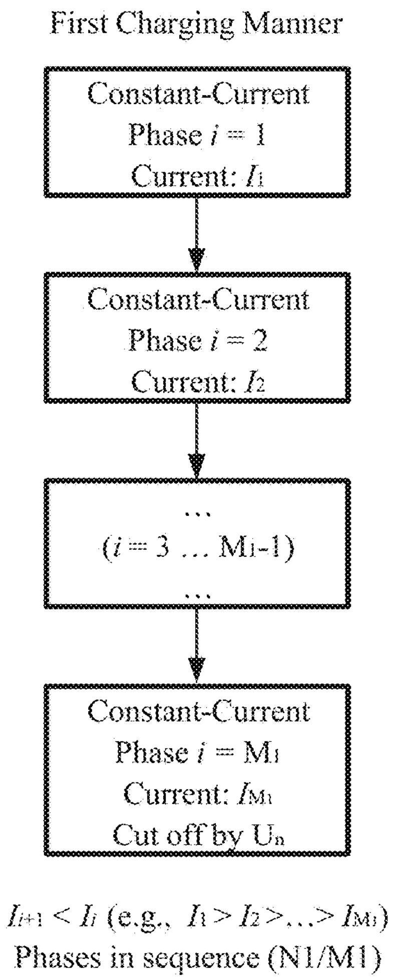
FIG. 4A is a schematic diagram of a first charging manner according to an embodiment of this application.

In an embodiment, as shown in FIG. 4A, the first charging manner includes N1 charging phases in sequence, where N1 is a positive integer greater than or equal to 1, and in the N1-th charging phase, the first battery is charged constantly with the charge cut-off voltage $U_n$.

For example, when N1 is equal to 3, the first charging manner includes a first charging phase, a second charging phase and a third charging phase. In the first charging phase, the first battery is charged to a voltage $U_1$ ($U_1<U_n$) constantly with a first current; in the second charging phase, the first battery is charged to the charge cut-off voltage $U_n$ constantly with a second current; and in the third charging phase, the first battery is charged constantly with the charge cut-off voltage $U_n$. To be specific, in the last charging phase in the charging manner, the first battery is charged constantly with the charge cut-off voltage $U_n$, and no requirement for voltage in charging phases before the last charging phase is made.

In another embodiment, as shown in FIG. 4A, the first charging manner includes M1 constant-current charging phases in sequence, where M1 is a positive integer greater than 1, and the M1 constant-current charging phases are each defined as an i-th charging phase, with i=1, 2, . . . , M1, where in the foregoing constant-current charging phases, after a voltage of the first battery reaches the charge cut-off voltage $U_n$, each of the subsequent constant-current charging phases is cut off by using the charge cut-off voltage $U_n$. Before a charge voltage of the first battery reaches the charge cut-off voltage $U_n$, a voltage of the first battery in each of the other charging phases is not limited. It should be noted that, in charging phases before a k-th charging phase (k<M1), a voltage of the first battery in a constant-current charging process is not limited; and in all charging phases after a (k+1)-th charging phase, the first battery is charged to the charge cut-off voltage $U_n$ with a constant current.

For example, when M1 is equal to 5, the first charging manner includes a first constant-current charging phase, a second constant-current charging phase, a third constant-current charging phase, a fourth constant-current charging phase, and a fifth constant-current charging phase. In the first constant-current charging phase, the first battery is charged to 4.25 V with a constant current of 3 C (a first current); in the second constant-current charging phase, the first battery is charged to 4.45 V (that is, the charge cut-off voltage $U_n$) with a constant current of 2 C (a second current); in the third constant-current charging phase, the first battery is charged to 4.45 V with a constant current of 1 C (a third current); in the fourth constant-current charging phase, the first battery is charged to 4.45 V with a constant current of 0.5 C (a fourth current); and in the fifth constant-current charging phase, the first battery is charged to 4.45 V with a constant current of 0.2 C (a fifth current).

It should be noted that, in this embodiment, the charge current of the (i+1)-th charging phase is less than the charge current of the i-th charging phase, that is, the charge current of each constant-current charging phase gradually decreases.

Step S2: After the n-th charging process is completed, leave the first battery standing, and obtain an open-circuit voltage $OCV_n$ of the first battery at a standing time of $t_i$.

An actual aging state of the battery in a use process needs to be determined, and then by how much the voltage is to be increased is determined based on the actual aging state. As such, it is necessary to leave the first battery standing after the n-th charging process is completed, and to obtain an open-circuit voltage of the first battery during or after the standing process, and by how much the voltage is to be increased is determined based on the open-circuit voltage. In this application, the open-circuit voltage $OCV_n$ of the first battery at the standing time of $t_i$ is obtained.

It should be noted that, the open-circuit voltage $OCV_n$ includes an open-circuit voltage of the first battery collected at the standing time of $t_i$ in the standing process that follows completion of the n-th charging process. The open-circuit voltage $OCV_n$ further includes a pre-stored open-circuit voltage of a second battery collected at the standing time of $t_i$ in the standing process that follows completion of the n-th charging process, where the first battery and the second battery are different batteries in a same battery system.

Step S3: In an m-th charging process, charge the first battery to the charge cut-off voltage $U_n$ in the first charging manner, where m is a positive integer, and m>n.

In this embodiment, in charging processes following the n-th charging process (for example, the m-th charging process), the first battery is charged to the charge cut-off voltage $U_n$ in the same first charging manner as in the n-th charging process, then the first battery is left standing, and an open-circuit voltage $OCV_m$ of the first battery at the same standing time of $t_i$ is obtained.

Therefore, whether the charge cut-off voltage needs to be increased may be determined based on a change of the open-circuit voltage of the first battery in the charging process.

Step S4: After the m-th charging process is completed, leave the first battery standing, and obtain an open-circuit voltage $OCV_m$ of the first battery at the standing time of $t_i$.

In this embodiment, the open-circuit voltage $OCV_m$ includes an open-circuit voltage of the first battery collected at the standing time of $t_i$ in the standing process that follows completion of the m-th charging process; and the open-circuit voltage $OCV_m$ further includes a pre-stored open-circuit voltage of a second battery collected at the standing time of $t_i$ in the standing process that follows completion of the m-th charging process, where the first battery and the second battery are different batteries in a same battery system.

Step S5: Compare the open-circuit voltage $OCV_n$ with the open-circuit voltage $OCV_m$ by magnitude. Under the condition of $OCV_n>OCV_m$, it is determined that the charge cut-off voltage needs to be increased in an (m+1)-th charging process and subsequent charging processes, and step S6 is performed; and under the condition of $OCV_n \leq OCV_m$, it is determined that the charge cut-off voltage does not need to be increased in the (m+1)-th charging process and the subsequent charging processes, and step S7 is performed.

Step S6: Under the condition of $OCV_n>OCV_m$, charge the first battery to the charge cut-off voltage $U_n$ in the first charging manner and then continue to charge the first battery to a first voltage $U_{m+1}$ in a second charging manner, where $U_{m+1}=U_n+k\times(OCV_n-OCV_m)$, and $0<k\leq 1$.

In this embodiment, under the condition of $OCV_n>OCV_m$, the first battery is charged to the charge cut-off voltage $U_n$ in the original first charging manner, and the charge cut-off voltage of the first battery is also increased to continue to charge the first battery in the second charging manner. After the increase, specific magnitude of the charge cut-off voltage is determined by an actual state of the first battery. That is, in the charging process, open-circuit voltages of the first battery at the same standing time in standing processes following completion of all charging processes are collected. Based on a difference of an open-circuit voltage collected in a subsequent cyclic charging process (for example, the m-th charging process) and an open-circuit voltage collected in a previous cyclic charging process (for example, the n-th charging process), it is determined that the next charging process (for example, the (m+1)-th charging process) is to be adjusted (charging is performed with the charge cut-off voltage $U_n$ in the first charging manner, and then charging continues with the first voltage $U_{m+1}$ in the second charging manner), so as to fully charge the first battery in the cyclic charging processes without greatly prolonging the time required for fully charging the first battery. Specifically, the first voltage $U_{m+1}=U_n+k\times(OCV_n-OCV_m)$.

It should be noted that, $U_{cl}\leq U_n\leq U_{cl}+500$ mV, where $U_{cl}$ is a limited charge voltage of a battery system to which the first battery belongs.

Figure 4B:
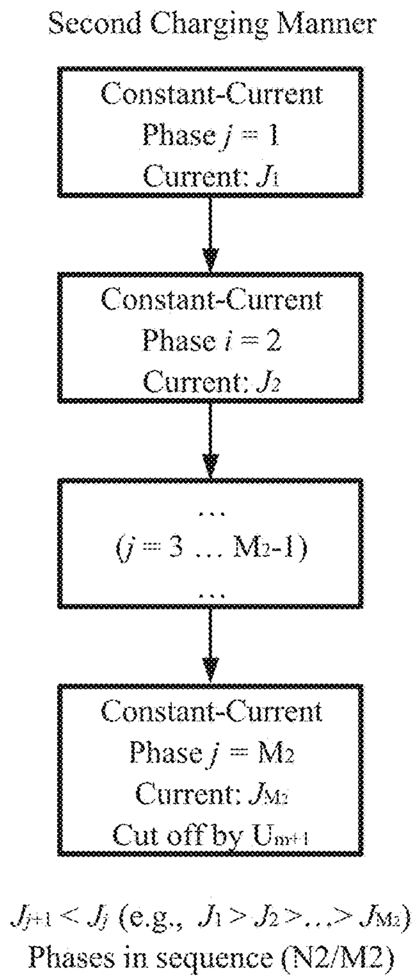
FIG. 4B is a schematic diagram of a second charging manner according to an embodiment of this application.

In an embodiment, as shown in FIG. 4B, the second charging manner includes N2 charging phases in sequence, where N2 is a positive integer greater than or equal to 1, and in the N2-th charging phase, the first battery is charged constantly with the first voltage $U_{m+1}$. That is, in the m-th charging process and the subsequent charging processes, the charge cut-off voltage is the first voltage $U_{m+1}$. For example, the second charging manner includes a charging phase like a third charging phase in the first charging manner that is described above. However, in the third charging phase of the second charging manner, the first battery is charged constantly with the first voltage $U_{m+1}$. It should be noted that, the charge cut-off voltage (that is, the first voltage $U_{m+1}$) of the first battery changes as the cycle progresses, and therefore the first voltage $U_{m+1}$ is greater than the charge cut-off voltage $U_n$ described above.

In another embodiment, as shown in FIG. 4B, the second charging manner further includes M2 constant-current charging phases in sequence, where M2 is a positive integer greater than or equal to 1, where each constant-current charging phase of the M2 constant-current charging phases is cut off by using the first voltage $U_{m+1}$. The M2 constant-current charging phases are each defined as a j-th charging phase, with j=1, 2, . . . , M2, where a charge current of a (j+1)-th charging phase is less than a charge current of the j-th charging phase.

It should be noted that, the second charging manner includes a charging phase in which the first battery is charged constantly with the first voltage $U_{m+1}$, or includes cutting off each constant-current charging phase of the M2 constant-current charging phases by using the first voltage $U_{m+1}$ as the charge cut-off voltage. For example, the second charging manner includes constant-current charging phases like a second constant-current charging phase, a third constant-current charging phase, a fourth constant-current charging phase, and a fifth constant-current charging phase in the first charging manner that are described above. However, in the second constant-current charging phase, third constant-current charging phase, fourth constant-current charging phase, and fifth constant-current charging phase of the second charging manner, the cut-off voltage is the first voltage $U_{m+1}$.

It should be noted that, the N1 charging phases in the first charging manner may be equal to the N2 charging phases in the second charging manner (that is, N1 is equal to N2), or the N1 charging phases in the first charging manner may not be equal to the N2 charging phases in the second charging manner (that is, N1 is not equal to N2). For example, the second charging manner may only include a first charging phase and a second charging phase.

Step S7: Under the condition of $OCV_n \leq OCV_m$, in the (m+1)-th charging process and the subsequent charging processes, charge the first battery to the charge cut-off voltage $U_n$ in the first charging manner.

In this embodiment, under the condition of $OCV_n \leq OCV_m$, a corresponding charging process of the second charging manner does not need to be added.

It should be noted that, in cyclic charging processes following the m-th charging process, judgment on the open-circuit voltage of the first battery also needs to be performed, so as to determine whether the charge cut-off voltage of the first battery needs to be increased again. Specifically, the charging method further includes: in an (m+b)-th charging process, charging the first battery to the charge cut-off voltage $U_n$ in the first charging manner and then continuing to charge the first battery to the first voltage $U_{m+1}$ in the second charging manner, where b is a positive integer greater than 1; after the (m+b)-th charging process is completed, leaving the first battery standing, and obtaining an open-circuit voltage $OCV_{m+b}$ of the first battery at the standing time of $t_i$; and under the condition of $OCV_n > OCV_{m+b}$, in an (m+b+1)-th charging process and subsequent charging processes, charging the first battery to the first voltage $U_n$ in the first charging manner and then continuing to charge the first battery to a second voltage $U_{m+b+1}$ in the second charging manner, where $U_{m+b+1} = U_{m+1} + k \times (OCV_n - OCV_{m+b})$, and $0 < k \leq 1$. Under the condition of $OCV_n \leq OCV_{m+b}$, in the (m+b+1)-th charging process and the subsequent charging processes, the first battery is charged to the charge cut-off voltage $U_n$ in the first charging manner, and then the first battery is charged to the first voltage $U_{m+1}$ in the second charging manner.

It should be noted that, in the (m+b+1)-th charging process and the subsequent charging processes, the second charging manner also includes N2 charging phases in sequence, where N2 is a positive integer greater than or equal to 1, and in the N2-th charging phase, the first battery is charged constantly with the second voltage $U_{m+b+1}$. The second charging manner further includes M2 constant-current charging phases in sequence, where M2 is a positive integer greater than 1, where each constant-current charging phase of the M2 constant-current charging phases is cut off by using the second voltage $U_{m+b+1}$ as the charge cut-off voltage, and the M2 constant-current charging phases are each defined as a j-th charging phase, with j=1, 2, . . . , M2, where a charge current of a (j+1)-th charging phase is less than a charge current of the j-th charging phase.

In conclusion, in the embodiments of this application, based on an actual aging state of the battery, the charge cut-off voltage of the battery in the charging process is increased, so as to resolve the problem that with the cycling of a battery, impedance of the battery increases, and the battery cannot be fully charged by using a charging method with a relatively large charge cut-off current. For example, the charging method provided by the embodiments of this application can resolve a problem, with some existing fast charging methods, that with the cycling of a battery, the battery is gradually unable to be fully charged. In some fast charging methods, the charge cut-off voltage and the cut-off current of the battery are increased in the charging process. The charging method provided by the embodiments of this application can not only meet a requirement for fully charging a battery, but also shorten the time required for charging the battery to a full charge state, so as to improve user experience.

To make the objectives, technical solutions, and technical effects of this application clearer, the following further describes this application in detail with reference to the accompanying drawings and examples. It should be understood that the examples provided in this specification are merely intended to interpret this application, but not intended to limit this application. This application is not limited to the examples provided in this specification.

As described below, in Comparative Example 1, a charging method for increasing a voltage and a charge cut-off current of a constant-voltage charging process on the basis of a charging method (constant-current and constant-voltage charging) in the prior art is used to charge the battery (the first battery or the second battery described above). In Comparative Example 2, a charging method is used for resolving a problem, with the charging method in Comparative Example 1 that charge cut-off state of charge (SOC) gradually decreases in cyclic charging processes. In Examples 1 to 3, the charging method described in this application is used, and values of k in Examples 1 to 3 are respectively 0.5, 0.8, and 1.

Comparative Example 1

Ambient temperature: 25° C.

Charging and discharging process:

Step 1: Charge the battery with a constant current of 3 C until the voltage of the battery reaches 4.25 V;

Step 2: Charge the battery with a constant current of 2 C until the voltage of the battery reaches 4.45 V, Step 3: Charge the battery with a constant current of 1.4 C until the voltage of the battery reaches 4.5V;

Step 4: Continue to charge the battery with a constant voltage of 4.5 V until the current of the battery reaches a cut-off current of 0.25 C;

Step 5: Leave the battery standing for 1 minute;

Step 6: Then discharge the battery with a constant current of 1.0 C until the voltage of the battery reaches 3.0 V;

Step 7: Then leave the battery standing for 1 minute again; and

Step 8: Repeat Step 1 to Step 7 until 500 cycles.

Comparative Example 2

Ambient temperature: 25° C.

Charging and discharging process:

Step 1: Charge the battery with a constant current of 3 C until the voltage of the battery reaches 4.25 V, Step 2: Charge the battery with a constant current of 2 C until the voltage of the battery reaches 4.45 V;

Step 3: Charge the battery with a constant current of 1.4 C until the voltage of the battery reaches 4.5V;

Step 4: Continue to charge the battery with a constant voltage of 4.5 V until the current of the battery reaches a cut-off current of 0.25 C;

Step 5: Leave the battery standing for 5 minutes;

Step 6: Charge the battery with a constant voltage of 4.45 V until the current of the battery reaches a cut-off current of 0.05 C;

Step 7: Leave the battery standing for 1 minute;

Step 8: Then discharge the battery with a constant current of 1.0 C until the voltage of the battery reaches 3.0 V.

Step 9: Then leave the battery standing for 1 minute again; and

Step 10: Repeat Step 1 to Step 9 until 500 cycles.

Example 1

Ambient temperature: 25° C.

It should be noted that, Examples 1 to 3 each include a process of obtaining the open-circuit voltage $OCV_n$ and a charging and discharging process. Here, a method for obtaining the open-circuit voltage $OCV_n$ is described first. In this embodiment, a fresh battery is selected for obtaining the parameter $OCV_n$, and specifically, the process of obtaining the open-circuit voltage $OCV_n$ is as follows:

Step 1: Charge the battery with a constant current of 3 C until the voltage of the battery reaches 4.25 V, Step 2: Charge the battery with a constant current of 2 C until the voltage of the battery reaches 4.45 V, Step 3: Charge the battery with a constant current of 1.4 C until the voltage of the battery reaches 4.5V;

Step 4: Continue to charge the battery with a constant voltage of 4.5 V until the current of the battery reaches a cut-off current of 0.25 C;

Step 5: Leave the battery standing for 1 minute, and collect the open-circuit voltage $OCV_n$ of the battery that has been standing for 1 minute, where a value of the open-circuit voltage is $OCV_n$=4.47V.

The charging and discharging process is as follows:

Ambient temperature: 25° C.

Step 1: Charge the battery with a constant current of 3 C until the voltage of the battery reaches 4.25 V;

Step 2: Charge the battery with a constant current of 2 C until the voltage of the battery reaches 4.45 V, Step 3: Charge the battery with a constant current of 1.4 C until the voltage of the battery reaches $U_n$ where $U_n$=4.5V;

Step 4: Continue to charge the battery with a constant voltage of 4.5 V until the current of the battery reaches a cut-off current of 0.25 C;

Step 5: Leave the battery standing for 1 minute, and collect the open-circuit voltage $OCV_m$ of the battery that has been standing for 1 minute;

Step 6: Then discharge the battery with a constant current of 1.0 C until the voltage of the battery reaches 3.0 V.

Step 7: Then leave the battery standing for 1 minute again;

Step 8: Calculate a value $U_{m+1}$ of a first voltage in a constant-voltage charging process in step 12, with $U_{m+1}=U_n+k\times(4.47-OCV_m)$, where k=0.5;

Step 9: Charge the battery with a constant current of 3 C until the voltage of the battery reaches 4.25 V;

Step 10: Charge the battery with a constant current of 2 C until the voltage of the battery reaches 4.45 V;

Step 11: Charge the battery with a constant current of 1.4 C until the voltage of the battery reaches 4.5 V;

Step 12: Continue to charge the battery with a constant voltage of 4.5 V until the current of the battery reaches a cut-off current of 0.25 C;

Step 12: Continue to charge the battery with a constant voltage $U_{m+1}$ until the current of the battery reaches a cut-off current of 0.25 C;

Step 13: Leave the battery standing for 1 minute, and collect the open-circuit voltage $OCV_{m+1}$ of the battery that has been standing for 1 minute;

Step 14: Then discharge the battery with a constant current of 1.0 C until the voltage of the battery reaches 3.0 V;

Step 15: Repeat step 8 to step 14 until 500 cycles, with 1 added to m automatically after each cycle.

Example 2

It should be noted that, in Example 2, a fresh battery is selected for obtaining the parameter, open-circuit voltage $OCV_n$, by using the same method as in Example 1, where $OCV_n$=4.47V. For a specific obtaining process, refer to Example 1. Details are not described herein again.

The charging and discharging process is as follows:

Ambient temperature: 25° C.

Step 1: Charge the battery with a constant current of 3 C until the voltage of the battery reaches 4.25 V, Step 2: Charge the battery with a constant current of 2 C until the voltage of the battery reaches 4.45 V;

Step 3: Charge the battery with a constant current of 1.4 C until the voltage of the battery reaches the voltage $U_n$, where $U_n$=4.5V;

Step 4: Continue to charge the battery with a constant voltage of 4.5 V until the current of the battery reaches a cut-off current of 0.25 C;

Step 5: Leave the battery standing for 1 minute, and collect the open-circuit voltage $OCV_m$ of the battery that has been standing for 1 minute;

Step 6:

Then discharge the battery with a constant current of 1.0 C until the voltage of the battery reaches 3.0 V.

Step 7: Then leave the battery standing for 1 minute again;

Step 8: Calculate a value $U_{m+1}$ of a first voltage in a constant-voltage charging process in step 12, with $U_{m+1}=U_n+k\times(4.47-OCV_m)$, where k=0.8;

Step 9: Charge the battery with a constant current of 3 C until the voltage of the battery reaches 4.25 V;

Step 10: Charge the battery with a constant current of 2 C until the voltage of the battery reaches 4.45 V;

Step 11: Charge the battery with a constant current of 1.4 C until the voltage of the battery reaches 4.5 V.

Step 12: Continue to charge the battery with a constant voltage of 4.5 V until the current of the battery reaches a cut-off current of 0.25 C;

Step 12: Continue to charge the battery with a constant voltage $U_{m+1}$ until the current of the battery reaches a cut-off current of 0.25 C;

Step 13: Leave the battery standing for 1 minute, and collect the open-circuit voltage $OCV_{m+1}$ of the battery that has been standing for 1 minute;

Step 14: Then discharge the battery with a constant current of 1.0 C until the voltage of the battery reaches 3.0 V;

Step 15: Repeat step 8 to step 14 until 500 cycles, with 1 added to m automatically after each cycle.

Example 3

It should be noted that, in Example 2, a fresh battery is selected for obtaining the parameter, open-circuit voltage $OCV_n$, by using the same method as in Example 1, where $OCV_n$=4.47V. For a specific obtaining process, refer to Example 1. Details are not described herein again.

The charging and discharging process is as follows:

Step 1: Charge the battery with a constant current of 3 C until the voltage of the battery reaches 4.25 V;

Step 2: Charge the battery with a constant current of 2 C until the voltage of the battery reaches 4.45 V, Step 3: Charge the battery with a constant current of 1.4 C until the voltage of the battery reaches the voltage $U_n$, where $U_n$=4.5V;

Step 4: Continue to charge the battery with a constant voltage of 4.5 V until the current of the battery reaches a cut-off current of 0.25 C;

Step 5: Leave the battery standing for 1 minute, and collect the open-circuit voltage $OCV_m$ of the battery that has been standing for 1 minute;

Step 6: Then discharge the battery with a constant current of 1.0 C until the voltage of the battery reaches 3.0 V;

Step 7: Then leave the battery standing for 1 minute again;

Step 8: Calculate a value $U_{m+1}$ of a first voltage in a constant-voltage charging process in step 12, with $U_{m+1}=U_n+k\times(4.47-OCV_m)$, where k=1;

Step 9: Charge the battery with a constant current of 3 C until the voltage of the battery reaches 4.25 V;

Step 10: Charge the battery with a constant current of 2 C until the voltage of the battery reaches 4.45 V;

Step 11: Charge the battery with a constant current of 1.4 C until the voltage of the battery reaches 4.5 V;

Step 12: Continue to charge the battery with a constant voltage of 4.5 V until the current of the battery reaches a cut-off current of 0.25 C;

Step 12: Continue to charge the battery with a constant voltage $U_{m+1}$ until the current of the battery reaches a cut-off current of 0.25 C;

Step 13: Leave the battery standing for 1 minute, and collect the open-circuit voltage $OCV_{m+1}$ of the battery that has been standing for 1 minute;

Step 14: Then discharge the battery with a constant current of 1.0 C until the voltage of the battery reaches 3.0 V;

Step 15: Repeat step 8 to step 14 until 500 cycles, with 1 added to m automatically after each cycle.

Constant voltages (CVs), charge cut-off SOCs and charge times of the battery during cycling in Comparative Examples 1 and 2 and Examples 1 to 3 are recorded in Table 1. It should be noted that, C is a charge/discharge rate, the charge/discharge rate refers to a current required for charging to a rated capacity or discharging the rated capacity within a specified time, and it is numerically equal to charge/discharge current/rated capacity of battery. For example, when the rated capacity is 10 Ah and the battery discharges at 2 A, a discharge rate of the battery is 0.2 C; and when the battery discharges at 20 A, the discharge rate of the battery is 2 C.

TABLE 1

Test results of Examples 1 to 3 and Comparative Examples 1 and 2

| | Value of n | Value of (m + 1) | Constant voltage (V) | Charge cut-off SOC | Charge time (min) |
|---|---|---|---|---|---|
| Comparative | 1 | 3 | 4.5 | 100.0% | 41.1 |
| Example 1 | 1 | 100 | 4.5 | 99.6% | 41.3 |
| | 1 | 200 | 4.5 | 99.2% | 41.6 |
| | 1 | 500 | 4.5 | 98.0% | 42.4 |
| Comparative | 1 | 3 | 4.5, 4.45 | 100.0% | 46.2 |
| Example 2 | 1 | 100 | 4.5, 4.45 | 99.9% | 48.3 |
| | 1 | 200 | 4.5, 4.45 | 99.8% | 50.5 |
| | 1 | 500 | 4.5, 4.45 | 99.5% | 57.8 |
| Example 1 | 1 | 3 | 4.5000 | 100.0% | 41.1 |
| (k = 0.5) | 1 | 100 | 4.5013 | 99.8% | 41.8 |
| | 1 | 200 | 4.5025 | 99.6% | 42.3 |
| | 1 | 500 | 4.5063 | 99.0% | 43.5 |
| Example 2 | 1 | 3 | 4.5000 | 100.0% | 41.1 |
| (k = 0.8) | 1 | 100 | 4.5020 | 99.9% | 41.9 |
| | 1 | 200 | 4.5040 | 99.8% | 42.5 |
| | 1 | 500 | 4.5100 | 99.5% | 43.8 |
| Example 3 | 1 | 3 | 4.5000 | 100.0% | 41.1 |
| (k = 1) | 1 | 100 | 4.5025 | 100.0% | 42.0 |
| | 1 | 200 | 4.5050 | 100.0% | 42.7 |
| | 1 | 500 | 4.5125 | 100.0% | 44.0 |

It can be learned from Table 1 that, in the charging method in Comparative Example 1, with the cycling of the battery, impedance of the battery gradually increases, the charge cut-off SOC gradually decreases, and the charge time is gradually prolonged. The charging method used in Comparative Example 2 resolves the problem with Comparative Example 1 that with use of the battery, the charge cut-off SOC gradually decreases. It can be learned from the results in Table 1 that, the charge cut-off SOC in Comparative Example 2 is obviously increased compared with Comparative Example 1, and the charge time is, however, greatly prolonged compared with Comparative Example 1.

Examples 1 to 3 can substantially resolve the problem with Comparative Example 1 that with use of the battery, the charge cut-off SOC decreases. Here, values of k in Examples 1 to 3 are respectively 0.5, 0.8, and 1. It can be learned from the results in Table 1 that, as the value of k increases, the charge cut-off SOC gradually increases during the cycling. When k is equal to 0.8, using the charging method provided by this application can achieve the same charge cut-off SOC as in Comparative Example 2. When k is equal to 1, using the charging method provided by this application allows the charge cut-off SOC to be always the same as that of the fresh battery (fresh battery), meaning that the battery can be fully charged. Although the corresponding charge time is slightly prolonged compared with Comparative Example 1 (for example, additional time is shorter than 2 minutes), this generally can be ignored. The fresh battery is a battery that has just left factory and that has not been cycled, or a battery with the number of charge-discharge cycles less than a preset number (for example, 10 or other numbers) after the battery leaves factory.

Therefore, in the embodiments of this application, adding the charging process of increasing the charge cut-off voltage of the battery based on the actual aging state of the battery resolves the problem that with the cycling of a battery, impedance of the battery increases, and the battery cannot be fully charged by using a charging method with a relatively large charge cut-off current. The charging method provided by the embodiments of this application can not only meet a requirement for fully charging a battery, but also shorten the time required for charging the battery to a full charge state, so as to improve user experience.

Figure 3:
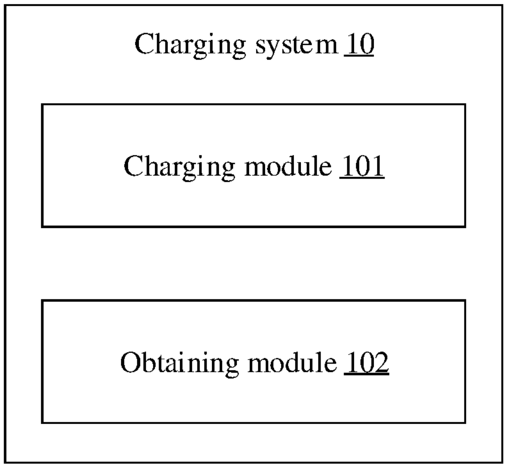
FIG. 3 is a diagram of functional modules of a charging system according to an embodiment of this application.

Referring to FIG. 3, in this embodiment, the charging system 10 may be divided into one or more modules, where the one or more modules may be stored in the processor 12, and the processor 12 executes the charging method in the embodiments of this application. The one or more modules may be a series of computer program instruction segments capable of completing particular functions, where the instruction segments are used to describe a process of execution by the charging system 10 in the electronic apparatus 1. For example, the charging system 10 may be divided into a charging module 101 and an obtaining module 102 in FIG. 3.

The charging module 101 is configured to: in an n-th charging process, charge a first battery to a charge cut-off voltage $U_n$ in a first charging manner, where n is a positive integer greater than 0; and the obtaining module 102 is configured to: after the n-th charging process is completed, leave the first battery standing, and obtain an open-circuit voltage OCV of the first battery at a standing time of $t_i$. The charging module 101 is further configured to: in an m-th charging process, charge the first battery to the charge cut-off voltage $U_n$ in the first charging manner, where m is a positive integer, and m>n. The obtaining module 102 is further configured to: after the m-th charging process is completed, leave the first battery standing, and obtain an open-circuit voltage $OCV_m$ of the first battery at the standing time of $t_i$. The charging module 101 is further configured to: under the condition of $OCV_n>OCV_m$, in an (m+1)-th charging process and subsequent charging processes, charge the first battery to the charge cut-off voltage $U_n$ in the first charging manner and then continue to charge the first battery to a first voltage $U_{m+1}$ in a second charging manner, where $U_{m+1}=U_n+k\times(OCV_n-OCV_m)$, and $0<k\leq 1$.

With the charging system 10, the charge cut-off voltage of the battery in the charging process can be increased, so as to resolve the problem that with the cycling of a battery, impedance of the battery increases, and the battery cannot be fully charged by using a charging method with a relatively large charge cut-off current. For specific content, reference may be made to the foregoing embodiments of the charging method for battery. Details are not described herein again.

In an embodiment, the processor 12 may be a central processing unit (Central Processing Unit, CPU), or may be other general-purpose processors, digital signal processors (Digital Signal Processor, DSP), application-specific integrated circuits (Application Specific Integrated Circuit, ASIC), field programmable gate arrays (Field-Programmable Gate Array, FPGA) or other programmable logic devices, discrete gates or transistor logic devices, discrete hardware components, or the like. The general-purpose processor may be a microprocessor, or the processor 12 may be any other conventional processors or the like.

If implemented in a form of software functional units and sold or used as separate products, the modules in the charging system 10 may be stored in a computer-readable storage medium. Based on this understanding, all or part of the processes of the method in the embodiments of this application may be implemented by a computer program instructing related hardware. The computer program may be stored in the computer-readable storage medium, and when the computer program is executed by a processor, the steps in the foregoing method embodiments may be implemented. The computer program includes computer program code, where the computer program code may be source code, object code, an executable file, some intermediate forms, or the like. The computer-readable medium may include: any entity or apparatus capable of carrying the computer program code, a recording medium, a USB flash disk, a mobile hard disk, a diskette, a compact disc, a computer memory, a read-only memory (ROM, Read-Only Memory), a random access memory (RAM, Random Access Memory), or the like.

It can be understood that the unit division described above is based on logical functions, and division in other manners may be used during actual implementation. In addition, in the embodiments of this application, all the functional modules may be integrated into a same processing unit, or each module may exist alone physically, or two or more modules may be integrated into a same unit. The integrated module may be implemented in a form of hardware, or may be implemented in a form of hardware and software functional modules.

The one or more modules may alternatively be stored in the memory and executed by the processor 12. The memory 11 may be an internal storage device of the electronic apparatus 1, that is, a storage device built in the electronic apparatus 1. In other embodiments, the memory 11 may alternatively be an external storage device of the electronic apparatus 1, that is, a storage device externally connected to the electronic apparatus 1.

In some embodiments, the memory 11 is configured to: store program code and various data, for example, program code of the charging system 10 installed on the electronic apparatus 1; and implement high-speed automatic access to programs or data during running of the electronic apparatus 1.

The memory 11 may include a random access memory, and may also include a non-volatile memory, for example, a hard disk, an internal memory, a plug-in hard disk, a smart media card (Smart Media Card, SMC), a secure digital (Secure Digital, SD) card, a flash card (Flash Card), or at least one disk storage device, flash memory, or other volatile solid-state storage device.

It is apparent for persons skilled in the art that this application is not limited to the details of the foregoing illustrative embodiments, and can be implemented in other specific forms without departing from the spirit or basic features of this application. Therefore, the foregoing embodiments of this application shall, in whatever aspect, be considered as being illustrative rather than limitative. The scope of this application is defined by the appended claims rather than the above description, and therefore all variations falling within the meaning and scope of the claims and their equivalents are intended to be encompassed in this application.

What is claimed is:

1. A charging method for battery, comprising:

in an n-th charging process, charging a first battery to a charge cut-off voltage $U_n$ in a first charging manner, wherein n is a positive integer greater than 0, wherein the first charging manner comprises M1 constant-current charging phases in sequence, wherein M1 is a positive integer greater than 1, after the first battery is charged to the charge cut-off voltage $U_n$ with a constant current, each of the subsequent constant-current charging phases is cut off by using the charge cut-off voltage $U_n$, and the M1 constant-current charging phases are each defined as an i-th charging phase, with i=1, 2, . . . , M1, wherein a charge current of an (i+1)-th charging phase is less than a charge current of the i-th charging phase;

after the n-th charging process is completed, leaving the first battery standing, and obtaining an open-circuit voltage $OCV_n$ of the first battery at a standing time of $t_i$;

in an m-th charging process, charging the first battery to the charge cut-off voltage $U_n$ in the first charging manner, wherein m is a positive integer, and m>n;

after the m-th charging process is completed, leaving the first battery standing, and obtaining an open-circuit voltage $OCV_m$ of the first battery at the standing time of $t_i$; and under a condition of $OCV_n>OCV_m$, in an (m+1)-th charging process and subsequent charging processes, charging the first battery to the charge cut-off voltage $U_n$ in the first charging manner, and after charging the first battery to the charge cut-off voltage $U_n$ in the first charging manner, continuing to charge the first battery to a first voltage $U_{m+1}$ in a second charging manner, where $U_{m+1}=U_n+k\times(OCV_n-OCV_m)$, and $0<k\leq 1$, wherein the second charging manner comprises M2 constant-current charging phases in sequence, wherein M2 is a positive integer greater than 1, each constant-current charging phase of the M2 constant-current charging phases being cut off by using the first voltage $U_{m+1}$, and the M2 constant-current charging phases are each defined as a j-th charging phase, with j=1, 2, . . . , M2, wherein a charge current of a (j+1)-th charging phase is less than a charge current of the j-th charging phase.

2. The charging method according to claim 1, wherein the open-circuit voltage $OCV_n$ further comprises a pre-stored open-circuit voltage, wherein the open-circuit voltage is an open-circuit voltage of a second battery collected at the standing time of $t_i$ in the standing process that follows completion of the n-th charging process, wherein the first battery and the second battery are different batteries in a same battery system.

3. The charging method according to claim 1, further comprising:

under a condition of $OCV_n\leq OCV_m$, in the (m+1)-th charging process and the subsequent charging processes, charging the first battery to the charge cut-off voltage $U_n$ in the first charging manner.

4. The charging method according to claim 1, further comprising:

in an (m+b)-th charging process, charging the first battery to the charge cut-off voltage $U_n$ in the first charging manner and then continuing to charge the first battery to the first voltage $U_{m+1}$ in the second charging manner, where b is a positive integer greater than 1;

after the (m+b)-th charging process is completed, leaving the first battery standing, and obtaining an open-circuit voltage $OCV_{m+b}$ of the first battery at the standing time of $t_i$; and under a condition of $OCV_n>OCV_{m+b}$, in an (m+b+1)-th charging process and subsequent charging processes, charging the first battery to the charge cut-off voltage $U_n$ in the first charging manner and then continuing to charge the first battery to a second voltage $U_{m+b+1}$ in the second charging manner, where $U_{m+b+1}=U_{m+1}+k\times(OCV_n-OCV_{m+b})$, and $0<k\leq 1$.

5. The charging method according to claim 4, further comprising:

under a condition of $OCV_n\leq OCV_{m+b}$, in the (m+b+1)-th charging process and the subsequent charging processes, charging the first battery to the charge cut-off voltage $U_n$ in the first charging manner and then charging the first battery to the first voltage $U_{m+1}$ in the second charging manner.

6. The charging method according to claim 1, wherein $U_{cl}\leq U_n\leq U_{cl}+500$ mV, wherein $U_{cl}$ is a limited charge voltage of a battery system to which the first battery belongs.

7. The charging method according to claim 1, wherein the first charging manner comprises N1 charging phases in sequence, wherein N1 is a positive integer greater than or equal to 1, and in the N1-th charging phase, the first battery is charged constantly with the charge cut-off voltage $U_n$.

8. The charging method according to claim 1, wherein the second charging manner comprises N2 charging phases in sequence, wherein N2 is a positive integer greater than or equal to 1, and in the N2-th charging phase, the first battery is charged constantly with the first voltage $U_{m+1.}$

9. An electronic apparatus, comprising:

a battery; and a processor configured to execute the steps of:

in an n-th charging process, charging a first battery to a charge cut-off voltage $U_n$ in a first charging manner, wherein n is a positive integer greater than 0, wherein the first charging manner comprises M1 constant-current charging phases in sequence, wherein M1 is a positive integer greater than 1, after the first battery is charged to the charge cut-off voltage $U_n$ with a constant current, each of the subsequent constant-current charging phases is cut off by using the charge cut-off voltage $U_n$, and the M1 constant-current charging phases are each defined as an i-th charging phase, with i=1, 2, . . . , M1, wherein a charge current of an (i+1)-th charging phase is less than a charge current of the i-th charging phase;

after the n-th charging process is completed, leaving the first battery standing, and obtaining an open-circuit voltage $OCV_n$ of the first battery at a standing time of $t_i$;

in an m-th charging process, charging the first battery to the charge cut-off voltage $U_n$ in the first charging manner, wherein m is a positive integer, and m>n;

after the m-th charging process is completed, leaving the first battery standing, and obtaining an open-circuit voltage $OCV_m$ of the first battery at the standing time of $t_i$; and under a condition of $OCV_n>OCV_m$, in an (m+1)-th charging process and subsequent charging processes, charging the first battery to the charge cut-off voltage $U_n$ in the first charging manner, and after charging the first battery to the charge cut-off voltage $U_n$ in the first charging manner, continuing to charge the first battery to a first voltage $U_{m+1}$ in a second charging manner, where $U_{m+1}=U_n+k\times(OCV_n-OCV_m)$, and $0<k\leq 1$, wherein the second charging manner comprises M2 constant-current charging phases in sequence, wherein M2 is a positive integer greater than 1, each constant-current charging phase of the M2 constant-current charging phases being cut off by using the first voltage $U_{m+1}$, and the M2 constant-current charging phases are each defined as a j-th charging phase, with j=1, 2, . . . , M2, wherein a charge current of a (j+1)-th charging phase is less than a charge current of the j-th charging phase.

10. The electronic apparatus according to claim 9, wherein the voltage $OCV_n$ further comprises a pre-stored open-circuit voltage, wherein the open-circuit voltage is an open-circuit voltage of a second battery collected at the standing time of $t_i$ in the standing process that follows completion of the n-th charging process, wherein the first battery and the second battery are different batteries in a same battery system.

11. The electronic apparatus according to claim 9, wherein the processor is further configured to execute the steps of:

under a condition of $OCV_n \leq OCV_m$, in the (m+1)-th charging process and the subsequent charging processes, charging the first battery to the charge cut-off voltage $U_n$ in the first charging manner.

12. The electronic apparatus according to claim 9, wherein the processor is further configured to execute the steps of:

in an (m+b)-th charging process, charging the first battery to the charge cut-off voltage $U_n$ in the first charging manner and then continuing to charge the first battery to the first voltage $U_{m+1}$ in the second charging manner, where b is a positive integer greater than 1;

after the (m+b)-th charging process is completed, leaving the first battery standing, and obtaining an open-circuit voltage $OCV_{m+b}$ of the first battery at the standing time of $t_i$; and under a condition of $OCV_n > OCV_{m+b}$, in an (m+b+1)-th charging process and subsequent charging processes, charging the first battery to the charge cut-off first-voltage $U_n$ in the first charging manner and then continuing to charge the first battery to a second voltage $U_{m+b+1}$ in the second charging manner, where $U_{m+b+1}=U_{m+1}+k\times(OCV_n-OCV_{m+b})$, and $0<k\leq 1$.

13. The electronic apparatus according to claim 12, the processor is further configured to execute the steps of:

under a condition of $OCV_n \leq OCV_{m+b}$, in the (m+b+1)-th charging process and the subsequent charging processes, charging the first battery to the charge cut-off voltage $U_n$ in the first charging manner and then charging the first battery to the first voltage $U_{m+1}$ in the second charging manner.

14. The electronic apparatus according to claim 9, wherein $U_{cl} \leq U_n \leq U_{cl}+500$ mV, wherein $U_{cl}$ is a limited charge voltage of a battery system to which the first battery belongs.

15. The electronic apparatus according to claim 9, wherein the first charging manner comprises N1 charging phases in sequence, wherein N1 is a positive integer greater than or equal to 1, and in the N1-th charging phase, the first battery is charged constantly with the charge cut-off voltage $U_n$.

16. The electronic apparatus according to claim 9, wherein the second charging manner comprises N2 charging phases in sequence, wherein N2 is a positive integer greater than or equal to 1, and in the N2-th charging phase, the first battery is charged constantly with the first voltage $U_{m+1}$.

* * * * *